United States Patent
Pellengo Gatti

(10) Patent No.: US 10,246,284 B2
(45) Date of Patent: Apr. 2, 2019

(54) MACHINE FOR WINDING OF PRE-STRETCHED FILM REELS

(71) Applicant: NO.EL. S.R.L., San Pietro Mosezzo (IT)

(72) Inventor: Roberto Pellengo Gatti, San Pietro Mosezzo (IT)

(73) Assignee: NO.EL. S.R.L., San Pietro Mosezzo (IT)

( * ) Notice: Subject to any disclaimer, the term of this patent is extended or adjusted under 35 U.S.C. 154(b) by 727 days.

(21) Appl. No.: 14/786,778

(22) PCT Filed: May 9, 2014

(86) PCT No.: PCT/IB2014/061320
§ 371 (c)(1),
(2) Date: Oct. 23, 2015

(87) PCT Pub. No.: WO2014/181298
PCT Pub. Date: Nov. 13, 2014

(65) Prior Publication Data
US 2016/0083211 A1 Mar. 24, 2016

(30) Foreign Application Priority Data
May 9, 2013 (IT) .............. MI2013A0758

(51) Int. Cl.
*B29C 55/26* (2006.01)
*B29C 55/06* (2006.01)
(Continued)

(52) U.S. Cl.
CPC ............. *B65H 18/16* (2013.01); *B29C 55/02* (2013.01); *B65H 18/26* (2013.01); *B65H 23/195* (2013.01);
(Continued)

(58) Field of Classification Search
CPC ................................ B29C 55/06; B29C 55/26
(Continued)

(56) References Cited

U.S. PATENT DOCUMENTS 6,375,781 B1 * 4/2002 Wojcik .................... B29C 55/06
156/229
7,896,634 B2 * 3/2011 Suzuki .................... B29C 41/26
425/297

(Continued)

OTHER PUBLICATIONS

International Search Report of PCT/IB2014/061320 dated Jul. 24, 2014.

*Primary Examiner* — Joseph S Del Sole
*Assistant Examiner* — Thu Khanh T Nguyen
(74) *Attorney, Agent, or Firm* — Silvia Salvadori, P.C.; Silvia Salvadori

(57) ABSTRACT

A machine for producing coils of prestretched extendible film has a prestretching unit (10) for prestretching the film (F) and a winding unit (100) for winding the film in a coil provided with a series of rollers around which the advancing film winds partially; the winding unit comprises a winding roller (104) in pressing contact against the coil (R) of the prestretched film in winding progress; to obtain coils of constant diameter and high winding quality the final contact position is varied of the winding roller (104) against the coil (R) according to the length of the wound film and according to the required diameter of coil.

9 Claims, 3 Drawing Sheets

(51) Int. Cl.
*B65H 18/16* (2006.01)
*B65H 23/195* (2006.01)
*B65H 23/26* (2006.01)
*B65H 18/26* (2006.01)
*B29C 55/02* (2006.01)

(52) U.S. Cl.
CPC ..... *B65H 23/26* (2013.01); *B65H 2301/4143* (2013.01); *B65H 2301/5124* (2013.01); *B65H 2402/31* (2013.01); *B65H 2402/32* (2013.01); *B65H 2404/10* (2013.01); *B65H 2404/43* (2013.01); *B65H 2511/21* (2013.01); *B65H 2515/314* (2013.01); *B65H 2701/1716* (2013.01); *B65H 2701/1752* (2013.01); *B65H 2701/1944* (2013.01)

(58) Field of Classification Search
USPC ............... 425/335, 336, 363, 367, 404, 461
See application file for complete search history.

(56) References Cited

U.S. PATENT DOCUMENTS

| | | | |
|---|---|---|---|
| 9,333,699 B2* | 5/2016 | Linkies | ............... B29C 55/065 |
| 2002/0017740 A1 | 2/2002 | Gennesson | |
| 2007/0215741 A1 | 9/2007 | Vaughn et al. | |
| 2009/0131618 A1 | 5/2009 | Santillan Diaz de Leon | |

* cited by examiner

MACHINE FOR WINDING OF PRE-STRETCHED FILM REELS

This application is a U.S. national stage of PCT/IB2014/061320 filed on 9 May 2014, which claims priority to and the benefit of Italian Application No. MI2013A000758 filed on 9 May 2013, the contents of which are incorporated herein by reference in their entirety.

BACKGROUND OF THE INVENTION

The present invention relates to a machine for producing coils of prestretched extendible film.

PRIOR ART

Using extendible film, particularly low-density polyethylene produced in coils is known for packaging industrial products, food products and other products.

Prestretching the extendible film by a prestretching unit before winding on a coil is known. This enables the material to be stretched so as to stiffen the material, so as to obtain firm packaging of the product. Further, this prestretching causes a reduction in the thickness of the film per unit of length so as to minimise the quantity of material to be used for packaging, simplifying or even improving product packaging operations and making packaging cheap.

The prestretched extendible film can be wound around a core, for example of cardboard, or can be wound on itself without any core (so-called "coreless" technology).

For winding, a winding roller is provided that is in contact with the coil of the film F in winding progress supported by a reel. A pneumatic driver that acts on the winding roller keeps the winding roller in contact against the coil in winding progress.

However, during winding of the coil it is necessary for the pressure of the winding roller on the coil in winding progress to be light to enable air to be captured between the turns of the coil. In fact, the air captured between the turns acts as an elastic cushion so as to preserve the coil from damage caused by accidental falls or blows that damage the edge thereof and can make the use thereof a problem, taking into account the fact that the thicknesses of film are very thin, also less than 10 micron. Further, the air captured between the turns prevents the collapse of the central hole in coreless coils.

On the other hand, slight pressure on the coil in winding progress causes excessive jumps of the winding roller and thus causes irregular capture of air during winding. This prevents a constant coil diameter being obtained at the end of each winding.

Having noticeable variations in the diameter of the coils produced makes it difficult to package coils into boxes or on pallets particularly with automatic packaging systems.

OBJECTS OF THE INVENTION

Object of the present invention is to propose a machine for producing coils of prestretched extendible film that solves the aforesaid problems.

A further object of the present invention is that this machine is structurally and functionally simple.

SHORT DESCRIPTION OF THE INVENTION

This object is achieved by a machine for producing coils of prestretched extendible film in accordance with the appended claims.

SHORT DESCRIPTION OF THE DRAWINGS

In order to understand the invention better an embodiment thereof is disclosed below by way of non-limiting example, illustrated in the attached drawings, in which.

DETAILED DESCRIPTION OF THE INVENTION

Figure 1:
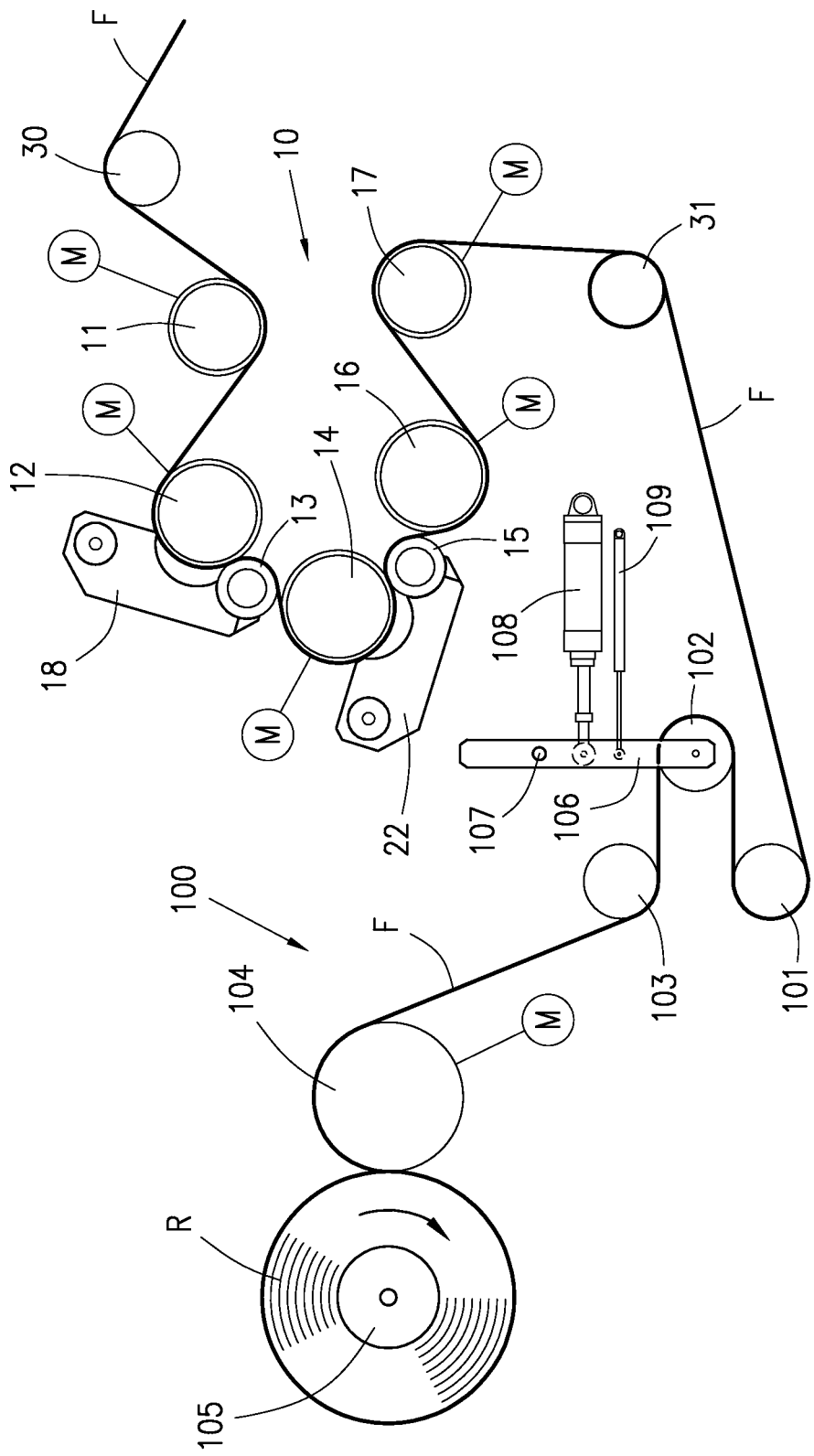
FIG. 1 is a schematic side view of a machine for producing coils of prestretched extendible film.

The machine for producing coils of prestretched extendible film illustrated in FIG. 1 comprises a prestretching unit, indicated generally by 10, and a winding unit, indicated generally by 100.

The illustrated prestretching unit 10 has in sequence a prestretching roller 11, a first main prestretching roller 12, a first auxiliary prestretching roller 13, a second main prestretching roller 14, a second auxiliary prestretching roller 15, a third main prestretching roller 16, and a detensioning roller 17.

The rollers 12,14,16 preferably have a cylindrical external surface of elastomeric material, whereas the rollers 13,15 preferably have a cylindrical external surface of metal material.

Each of the prestretching and detensioning rollers 11,17 and of the main prestretching rollers 12,14,16, is driven by a respective electric motor. For the sake of simplicity, the electric motors are all indicated by the letter M.

The prestretching roller 11 is near the first prestretching roller 12. The detensioning roller 17 is near the last prestretching roller 16.

The first auxiliary prestretching roller 13 is mounted freely rotatable on two opposite arms 18, only one of which is illustrated, mounted on two respective pivots that are pivoted on two respective adjustable plates that are not illustrated that are integral with the fixed structure of the machine. A driver, for example a pneumatic driver drives each arm 18 with linear movement that is not illustrated.

Equally, the second auxiliary prestretching roller 15 is mounted freely rotatable on two opposite arms 22, only one of which is illustrated, mounted on two respective pivots that are pivoted on two respective adjustable plates that are not illustrated, that are integral with the aforesaid fixed structure. Each arm 22 is driven by a driver, for example a pneumatic driver, with linear movement that is not illustrated.

Further external guiding rollers are also illustrated, namely with an inlet roller 30 upstream of the roller 11 and an outlet roller 31 downstream of the roller 17.

The winding unit 100 provides in sequence a guide roller 101, a jockey roller 102, a further guide roller 103, and a winding roller 104 that is in contact with a coil R of the film F in winding progress supported by a reel 105.

The jockey roller 102 is mounted on an oscillating arm 106 pivoted in 107 to the fixed structure of the machine. The oscillating arm 106 is connected to a driver 108, for example of pneumatic type, hinged at one end to the arm 106 and at the other end to the fixed structure of the machine.

The position of the oscillating arm 106 is controlled by a position transducer 109, for example of potentiometer type, hinged at one end to the arm 106 and at the other end to the fixed structure of the machine.

The winding roller 104 is driven by a motor M.

Figure 2:
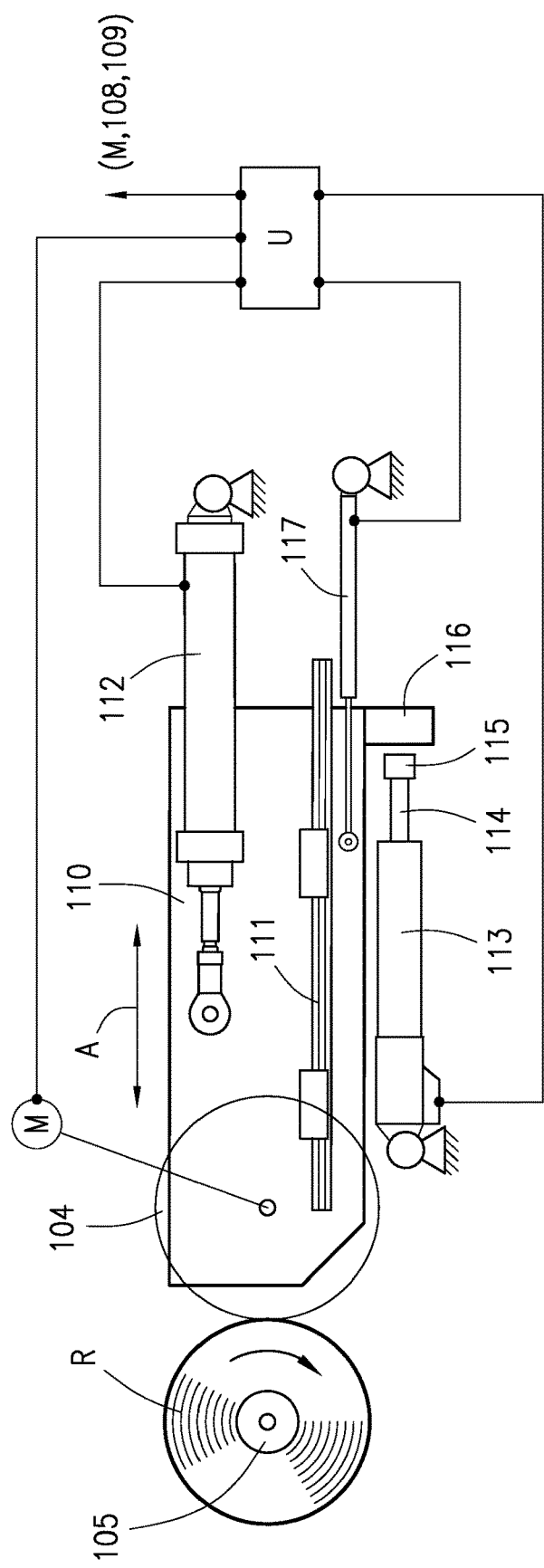
FIG. 2 is a schematic side view of a winding device of the machine in FIG. 1, according to the invention.

In FIG. 2 the winding device is shown in detail that actually winds the film F into a coil.

The winding roller 104 is mounted on two opposite slides that are slidable on guides in a rectilinear direction indicated by the double arrow A. In FIG. 2 a single slide is shown that is indicated by 110, with the respective guide, indicated by 111.

An actuator 112 acts on the slide 110, the actuator 112 being for example of pneumatic type, hinged at one end to the slide and at the other end to the fixed part of the machine. A further pneumatic driver can also act on the opposite slide.

An abutting member 113, for example of electromechanical type, is also provided, fitted with a movable stem 114 with an abutting head 115 arranged at an abutting element 116 that is integral with the slide 110. To move the slide 114 rectilinearly the member 113 can be provided with a brushless electric motor connected to the stem 114 through a recirculating ball screw that transforms the rotational motion of the motor into rectilinear motion of the stem 114.

The position of the slide 110 is controlled by a position transducer 117, for example of potentiometer type, hinged at one end to the slide 110 and at the other end to the fixed structure of the machine.

The disclosed machine also provides a command and control unit U, illustrated in FIG. 2, connected to all motors M, to the driver 108, to the position transducer 109, to the actuator 112, to the abutting member 113, and to the position transducer 117.

The operation of the disclosed and illustrated machine for producing coils of prestretched extendible film is as follows.

It must be pointed out that such a machine can be used both to prestretch extendible films coming from prepackaged coils (so-called "off line" operation) and for prestretching films coming directly from an extruder (so-called "in line" operation).

There is a manual preoperative step in which the extendible sheet film, indicated by F, is passed into the prestretching unit 10 through the rollers 30,11,12,14,16,17,31, winding partially around, and is then passed into the winding unit 100 through the rollers 101,102,103,104, winding partially around, and is lastly wound on the reel 105.

In the operating step the auxiliary roller 13 is brought against the roller 12 by the actuator that acts on the arm 18, whilst the auxiliary roller 15 is brought against the roller 14 by the actuator that acts on the arm 22.

The motors M are then started up to perform the prestretching operation.

The speed of the rollers is such that between the roller 11 and the roller 12 there is slight pretensioning, between the roller 12 and the roller 14 there is a first prestretching, and between the roller 14 and the roller 16 there is a second prestretching.

The auxiliary rollers 13 and 15, that rest respectively on the rollers 12 and 14 with the interposition of film F, are dragged, being freely rotatable, by the motion of the rollers 12,14 driven by the respective motors M.

The film F travels through all these rollers, winding partially around the rollers and undergoing prestretching caused by different speeds of the different rollers.

After second prestretching, between the roller 16 and the roller 17 there is a first detensioning caused by different speeds of the rollers 16 and 17, after which the film F is guided by the roller 31 to the winding unit 100.

The path in the winding unit enables the film F to wind around the guide roller 101, the jockey roller 102, and the last guide roller 103 that guides the film to the winding roller 104.

This winding roller 104 winds the film F around the reel 105, remaining in continuous contact with the coil R of film in winding progress.

After the first detensioning between the rollers 16 and 17, between the roller 17 and the winding roller 104 there is a second detensioning of the film F, caused by the differing speeds of the rollers 17 and 104.

The value of the first detensioning is greater than the value of the second detensioning and preferably the value of the first detensioning is about five times greater than the value of the second detensioning.

The pneumatic driver 108 opposes the drawing action of the film on the jockey roller 102 by acting on the arm 106, so as to maintain film tension constant.

Any variations in tension cause a movement of the arm 106 that is detected by the position transducer 109.

The actuator 112 maintains the winding roller 104 in contact against the coil R in the winding progress according to a preset contact pressure.

The abutting member 113 maintains in a final preset contact position the winding roller 104 against the coil R in winding progress by means of the stop of the element 116 of the slide 110 against the head 115 of the stem 114 of the abutting member 113, opposite the thrusting force exerted by the actuator 112. This contact position is varied according to the length of the film wound and the final diameter of coil required. In practice, by observing Fig. 2, the stop head 115 advances progressively to the right until it reaches the required coil diameter.

The command and control unit U commands and controls all the movements of all the motors M of the various rollers.

Further, in the case of variations in the tension of the film detected by the position transducer 109 the unit U varies the speed of the motors M of the rollers 17 and 104 so as to return the film to the correct tension value.

Lastly, the unit U commands the abutting member 113 to move the stem 114 in the manner seen above, keeping under control the contact position of the roller 104 against the coil R in winding progress by means of the position transducer 117 connected to the slide 110 on which the roller 104 is mounted.

The machine disclosed and illustrated has different advantages.

The presence of the abutting member enables the winding roller to exert correct pressure on the coil R in winding progress to avoid jumps of the winding roller and at the same time capture air between the turns of the coil in a regular manner so as to make the coil elastic in the event of a blow.

The final result is a coil of prestretched extendible film having the required diameter and high winding quality.

The serial production of coils of a substantially equal diameter makes packaging of the coils in boxes or on pallets easy, in particular with automatic packaging systems.

Figure 3:
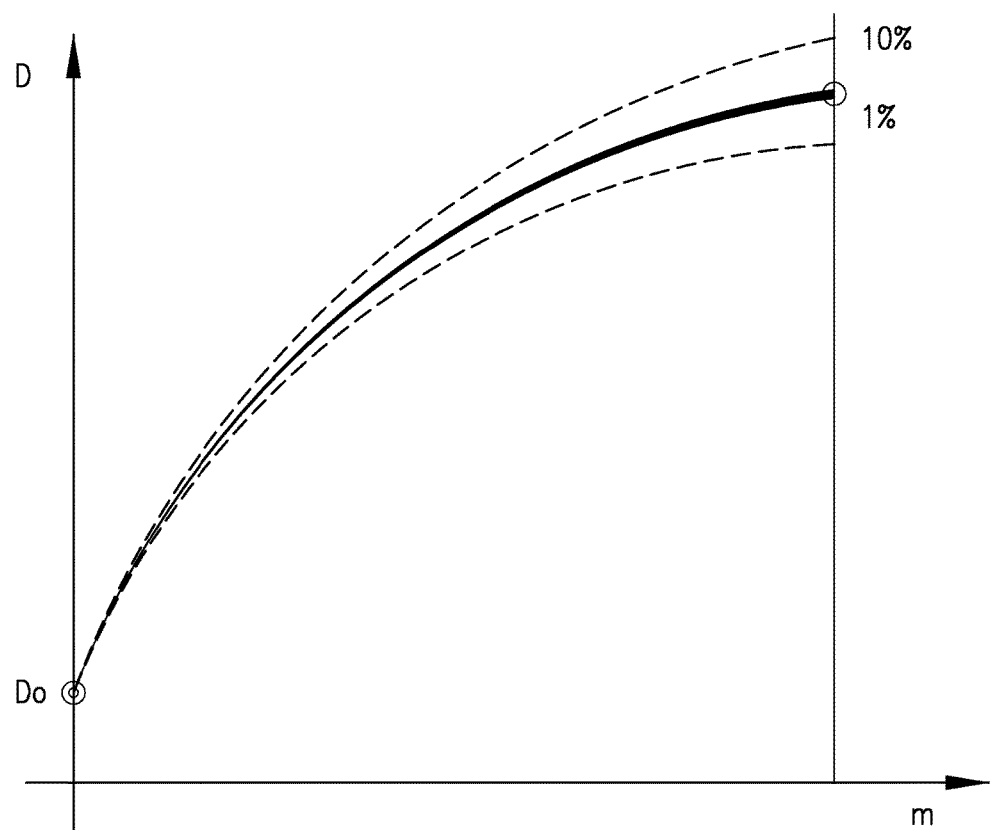
FIG. 3 shows a graph that sets out the winding parameters of the extendible film during processing in the machine of FIG. 1 that are compared with the parameters of a known machine.

In FIG. 3 a graph is shown, in which the x-coordinates show the metres m of wound film and the y-coordinates show the diameter D of wound coil. In the example of this graph there is a cardboard core that is Do in diameter, around which the coil of prestretched film is wound. A dashed line shows the behaviour of coils wound with known machines whereas the behaviour of coils wound with a machine according to the invention is shown on a continuous line. As can be seen, with known machines the final diameter of the coil can vary by 10% with respect to the required diameter, whereas with the machine according to the invention the final diameter of the coil can vary only by 1% with respect to the required diameter.

The illustrated machine is structurally and functionally simple because it consists of a few elementary mechanical components.

In addition, controlled detensioning prevents jamming of the coils and enables very fine cardboard tubes to be used.

It is clear that variations on and/or additions to what has been disclosed and illustrated above are possible.

In a simpler embodiment, only two main prestretching rollers and an auxiliary prestretching roller can be provided that acts on the first main prestretching roller. There will always be a detensioning roller downstream of the second prestretching roller.

The tension of the film before winding on a coil can be controlled by any pretensioning device of the film associated with any tension detector.

A pair of pneumatic drivers and a pair of abutting members can be provided that act on the two slides on which the winding roller is mounted, instead of a single driver and of a single abutting member as in the example disclosed and illustrated above. Any means for controlling the contact position of the winding roller against the coil in winding progress can be used that performs the functions of the driver and of the abutting member.

The invention claimed is:

1. Machine for producing coils of prestretched extendible film comprising a prestretching unit for prestretching a film and a winding unit for winding the film in a coil, said prestretching unit being provided with a series of prestretching rollers around which the film is prestretched, wherein the winding unit comprises a winding roller in pressing contact against a coil of the prestretched film in winding progress along length, said coil being provided with a required diameter, wherein said machine comprises
an actuator acting on the winding roller to achieve a pressing contact against the coil; and
an abutting member acting in an opposite direction to the actuator for varying a final contact position of the winding roller against the coil according to the length of the film and according to the required diameter of the coil.

2. Machine according to claim 1, wherein said actuator is connected on one side to a fixed part of the machine and on another side to a slide that supports the winding roller.

3. Machine according to claim 2, wherein said abutting member comprises at least one stem, driven linearly, with a stop head suitable for stopping against a stop element of said slide.

4. Machine according to claim 1, wherein the prestretching unit comprises in succession at least one first prestretching roller, an auxiliary prestretching roller that acts against the first roller with interposing of the film, and a second prestretching roller having a speed that is greater than the speed of the first roller to perform prestretching of the film, the prestretching unit further comprising a detensioning roller arranged downstream of said second prestretching roller and having a lower speed than said second prestretching roller and a greater speed than said winding roller, such as to obtain a first detensioning value of the film after prestretching and a second detensioning value of the film before winding.

5. Machine according to claim 4, further comprising a third prestretching roller, having a speed that is greater than the speed of the second prestretching roller to carry out a second prestretch, and a further auxiliary prestretching roller that is arranged between the second prestretching roller and the third prestretching roller and acts against the second prestretching roller with interposing of the film, said detensioning roller being arranged downstream of said third prestretching roller.

6. Machine according to claim 4, wherein the first detensioning value is greater than the second detensioning value.

7. Machine according to claim 6, wherein the first detensioning value is about five times greater than the value of the second detensioning value.

8. Machine according to claim 4, further comprising a device positioned between the detensioning roller and the winding roller, said device being associated with a film tension detector.

9. Machine according to claim 1, wherein a position transducer is provided for controlling the aforesaid final contact position of the winding roller and wherein a machine command and control unit (U) is provided that is connected to said abutting member and to said position transducer, said command and control unit (U) commanding and controlling variations of the final contact position of the winding roller.

* * * * *